March 13, 1951
C. C. KAJDAN
2,544,995
PARACHUTE HARNESS COUPLING DEVICE
AND SAFETY CLIP THEREFOR
Filed Sept. 13, 1945
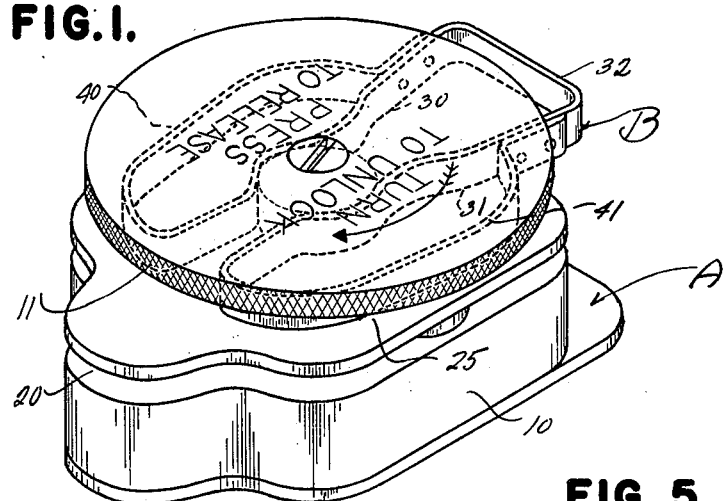
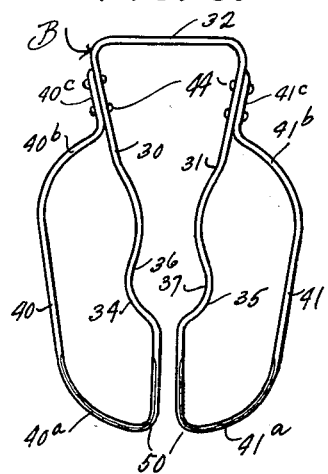
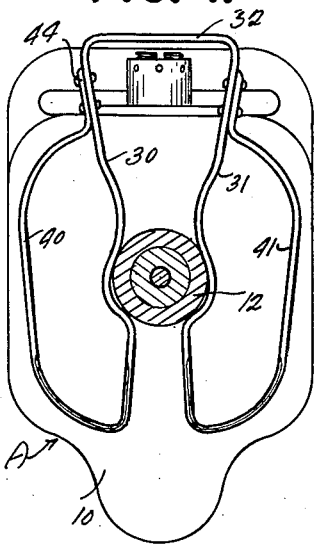
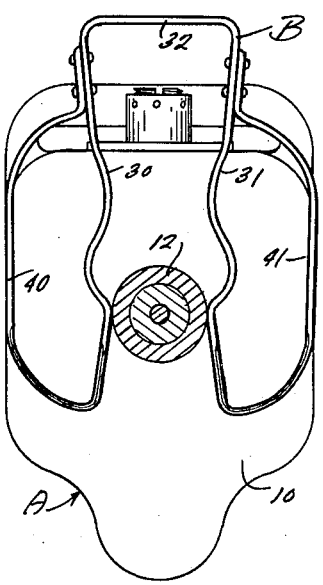
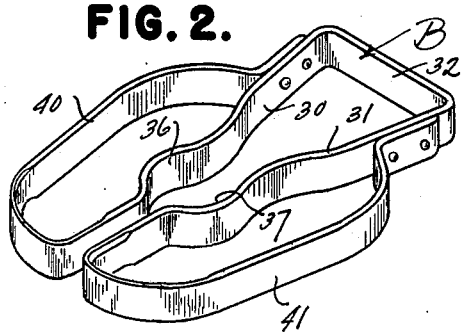
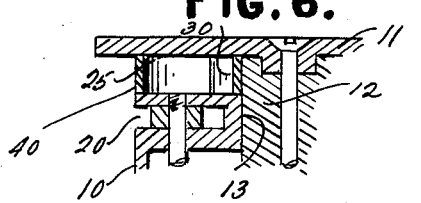
INVENTOR.
Chester C. Kajdan
BY Lancaster, Allwine W Rommel
ATTORNEYS.

Patented Mar. 13, 1951

2,544,995

UNITED STATES PATENT OFFICE 2,544,995

PARACHUTE HARNESS COUPLING DEVICE AND SAFETY CLIP THEREFOR

Chester C. Kajdan, Buffalo, N. Y., assignor to Irving Air Chute Co. Inc., Buffalo, N. Y., a corporation Application September 13, 1945, Serial No. 616,041

2 Claims. (Cl. 24—211)

This invention relates to improvements in means for making safe parachute harness strap coupling devices, and has particular reference to a safety clip which will insure the maintenance of the coupling in proper operating condition.

Other objects and advantages will be apparent from the following description.

In the accompanying drawing, forming a part of this specification and wherein similar reference characters designate corresponding parts thruout the several views:

Figure 1 is a perspective view of what is known in the parachute art as a single point release coupling. Shown with it is the improved safety clip.

Figure 2 is a perspective view of the clip.

Figure 3 is a plan view of the improved safety clip.

Figure 4 is a view showing the improved clip in a safety position upon a quick release harness coupling.

Figure 5 is a further view showing the clip in its partially removed condition upon a coupling.

Figure 6 is a fragmentary sectional view showing the clip in a fastener part receiving space of the coupling.

In the drawing, wherein for the purpose of illustration is shown only a preferred embodiment of the invention, the letter A may generally designate a single point release coupling, of any approved type, having the improved safety clip B associated therewith.

The coupling A is of the general operating structure shown in U. S. Patent 1,842,611. The arrangement of parts of this coupling are well known in the art and general reference will be made thereto in this application as including a supporting body 10 of any approved shape having a plurality of spring actuated fastener detents (not shown) therein. The coupling includes a depressible and rotatable operating member 11 having a plunger portion 12 slidable within an opening 13, as shown in Figure 6. Between the top of the depressible member and the body 10 there is a space 20 thru which the detents (not shown) ordinarily project, under normal spring action, and abut against the under surface of the top of the depressible member 11. Into this space fastening parts are adapted to be inserted; the detents having cam faces, of the nature shown in Patent 1,842,611 which will permit their insertion and securement therein.

The member 11, as described in the aforesaid patent, in its outermost position is locked, with the detents extended for fastener control. Thru rotation of the top of the depressible member 11, about ninety degrees, or any arc of desired degree, the depressible member is positioned so it can be depressed. Depression thereof will cause the detents to move from across the space 20 and the fasteners will drop out of position.

It has heretofore been proposed to utilize spring actuated depressible couplings of the type set forth in Patent 1,899,656 and employ therewith a safety clip to prevent the depression.

As an incident of use snow and ice gather in the space 25 between the depressible member top and the body, or other debris becomes lodged therein, preventing the depression thereof and the removal of the detents from the fasteners. This has frequently resulted in fatality to the parachutist, who is sometimes drowned in water, or maimed or killed as a result of being dragged over the ground after reaching the ground with a parachute canopy which refuses to collapse. Since in many cases the release couplings are exposed, dirt and other debris will clog the space 25, as a result of being dragged across the ground and of course under such circumstances it is virtually impossible to depress the operating member for releasing the harness strap from the coupling and the body of the wearer.

To obviate these difficulties I have provided an improved safety clip or member B which not only acts to provide a double safety locking feature for the depressible member, but also will enable the operator to eject any snow, ice, dirt or other debris which collects in the space 25. This is effected by pulling the safety clip off of the coupling at the time it is desired to release the harness fastener. The safety clip B includes a pair of resiliently connected arm portions 30 and 31 having a connecting bight 32. The clip may be made of any rigid material, such as metal or plastic, which will permit the arms to have a spring action between their collapsed and expanded positions shown respectively in Figures 3 and 5 of the drawing. The arms 30 and 31 are bowed at 34 and 35, providing socket portions 36 and 37 respectively, which engage the plunger portion 12 of the depressible member when the clip is inserted in the space 25 to lock the clip against accidental disposition as shown in Fig. 4. The clip can of course be swung to any position; the handle bight portion 32 projecting laterally from the space 25 to enable the aviator or parachutist to grasp the same with facility. The arms 30 and 31 are provided with material ejecting portions 40 and 41 formed of the same material as the other parts of the clip laterally beyond the outer side surfaces of said arms. In this connection a single strand of band metal may be bent to form the entire clip. These ejector portions 40 and 41 are connected at the outer ends of the arms 30 and 31 and convexly bowed close to 40ª and 41ª and therefrom extend rather straight and at the outer ends 40ᶜ and 41ᶜ, short of the bight portion 32, they are convexly bowed at 40ᵇ and 41ᵇ respectively and secured as by rivets 44 to the respective arms, short of the bight portion 32.

The material of which the arm and ejecting portions of the clip is formed is of a width substantially the same as the width of the space 25. In collapsed position the detent arms 30 and 31 of the clip are closely urged together and clip B cammed into position as the convex ends 50 of the arms slide over the plunger 12. The clip arms will snap into the position shown in Figure 4 for holding the clip against accidental disconnection.

During the parachute drop the operator of course, thru a rip cord or static line will cause the parachute pack to open and the canopy will deploy. Immediately before reaching the ground or just after reaching the ground, or if the parachutist is dropping in a high wind over water he will wish to become disconnected from the harness. At that time he will pull the clip B by grasping the handle portion 32 and release it from the single point release coupling A. This action will cause the arms 30 and 31 to spring outwardly and the material ejecting portions 40 and 41 will likewise move outwardly to substantially the position shown in Figure 5 for ejecting material from the space 25. Normally, the material ejecting portions of the clip lie inwardly from the outer margins of the coupling body and other associated parts, shown in Figure 4, but as an incident of removal of the clip, when the arms are fully extended the material ejecting portions 40 and 41 will move to a position at least flush with the outer margin of the single point release coupling A, or into projecting relation therefrom, if so desired, and this of course will insure removal of any debris from the space 25, so the depressible member may be turned and depressed for releasing the parachutist from the harness.

What is claimed is:

1. In combination with a parachute coupling device including a body having fastener means associated therewith and control means for the fastener means including a plunger having a depressible head connected therewith normally spaced from the body when the fastener means is in operative position for harness coupling purposes, a safety device for disposition in said space to prevent depression of said depressible member and said plunger including a pair of resilient arms normally urged toward each other for gripping said plunger when within said space, said arms being laterally extended for such distance in relation to said space and the dimensions of the body of the coupling whereby to substantially eject all debris from said space as an incident of withdrawal of the spacing device to permit depression of said depressible member and release of the fastening means.

2. In a combination coupling and safety clip the combination of a coupling body having fastening means associated therewith and a depressible plunger for actuating said fastening means, said plunger having a hand grasping disc connected therewith normally overhanging in spaced relation the coupling, and a safety clip for disposition in said space including a pair of resiliently connected spacing arms normally urged towards each other for gripping the plunger, the arms being of a width to prevent the depression of said disc by the actuation of said plunger, and said arms being of a length to have a portion of said clip extended from said space for hand grasping and pulling of the clip in order to release the same from the coupling, and means connected with said arms and extending laterally therefrom thru substantially the entire width of the space from side to side of the coupling for ejecting debris from said space laterally out of the space and off of the coupling upon removal of the clip from the coupling.

CHESTER C. KAJDAN.

REFERENCES CITED

The following references are of record in the file of this patent:

UNITED STATES PATENTS

| Number | Name | Date |
|---|---|---|
| 1,899,656 | Wigley et al. | Feb. 28, 1933 |
| 2,064,591 | David | Dec. 15, 1936 |
| 2,111,468 | Corkum | Mar. 15, 1938 |

FOREIGN PATENTS

| Number | Country | Date |
|---|---|---|
| 86,018 | Switzerland | Aug. 2, 1920 |